Dec. 31, 1957     F. K. BENNETT     2,818,482
HIGH SPEED CLINICAL THERMOMETERS
Filed April 21, 1953

INVENTOR.
*Frank K. Bennett*
BY *Albert F. Krosman*
ATTORNEY

United States Patent Office 2,818,482
Patented Dec. 31, 1957

2,818,482
HIGH SPEED CLINICAL THERMOMETERS

Frank K. Bennett, Plainfield, N. J., assignor to Victory Engineering Corporation, Union, N. J., a corporation of New Jersey Application April 21, 1953, Serial No. 350,009
1 Claim. (Cl. 201—63)

This invention relates to clinical thermometers, and particularly a high speed clinical thermometer which does not employ a column of mercury. Presently known clinical thermometers, employing a tube having a reservoir at one end thereof, contain a quantity of mercury or similar material and a capillary tube communicating with the reservoir, are subject to several shortcomings from the standpoint of operational use. The mercury tube thermometer is slow in giving a reading, difficult to read, and subject to ready breakage in handling.

Accordingly, it is an object of the present invention to provide a clinical thermometer which will have a very fast speed of response.

Another object of the present invention is to provide a clinical thermometer which will remain operative, despite hard usage and fairly rough handling.

A further object of the present invention is to provide a clinical thermometer which may be hot sterilized without damage thereto.

The invention consists of the construction, combination and arrangement of parts, as herein illustrated, described and claimed.

In the accompanying drawings, forming a part hereof, is illustrated one form of embodiment of the invention, in which drawings similar reference characters designate corresponding parts, and in which.

Figure 1:
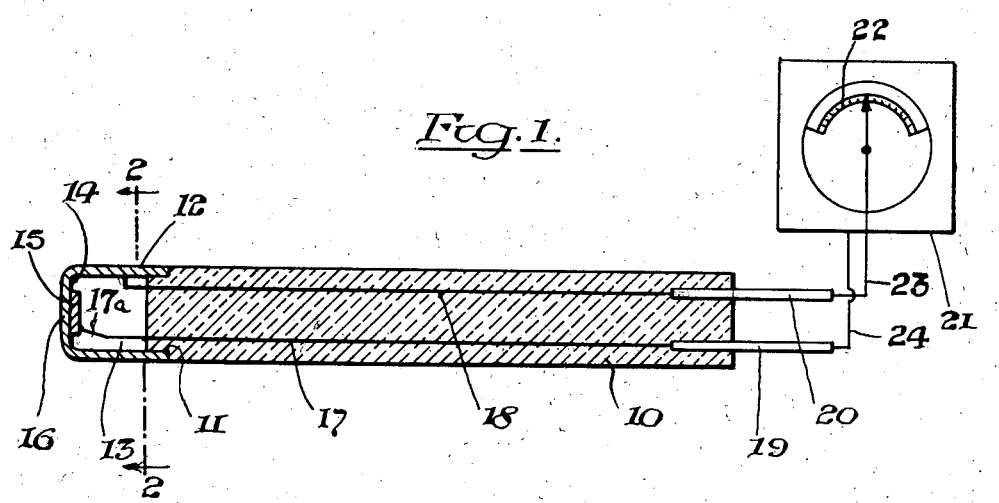
Figure 1 is a vertical section taken through a clinical thermometer, made in accordance with the present invention, with the temperature reading device somewhat diagrammatically shown.
Figure 2:
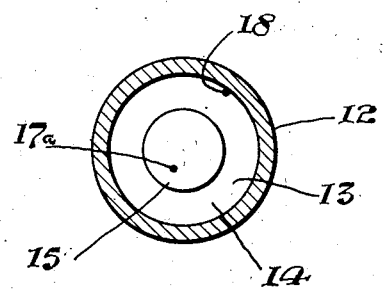
Figure 2 is a cross-sectional view taken on line 2—2 of Figure 1, looking in the direction indicated by the arrows.

Referring to the drawings, 10 indicates a cylindrical rod formed of a suitable dielectric material such as hard rubber, or some plastic material which will withstand high temperatures. The rod 10 is formed with a reduced portion at the front end thereof, as shown at 11 in Figure 1. A small cap member 12, preferably formed of silver or some other metal, is secured to the end of the rod 10, so as to overlie the reduced portion 11.

The cap member 12 extends beyond the end of the rod 10, so as to provide an air filled chamber 13 between the inner walls of the cap 12 and the end of the rod. A small disc type thermally-sensitive resistor 15, known in the art as a "thermistor," is secured to the inside of the front wall of the cap member 12. The thermistor 15 may be attached as by soldering or the like, in accordance with well known techniques.

A very fine electrically conductive wire 17a, having a thickness of the order of .001 inch, is soldered to the back face of the thermistor 15 and extends rearwardly thereof through the air chamber 13. A suitable lead wire 17 is connected to the thin wire 17a for the purpose of conducting electrical potential therefrom through the rod 10 to a contact element 19. The contact element 19 is embedded in and supported by the rod 10, as shown in Figure 1.

A second wire 18 is soldered to the inner wall 14 of the cap member 12, and is also led through the rod 10 and conductively secured to the contact element 20. The lead wire 18 may be of the same thickness as the lead 17, that is of the order of .012 inch or more.

Figure 3:
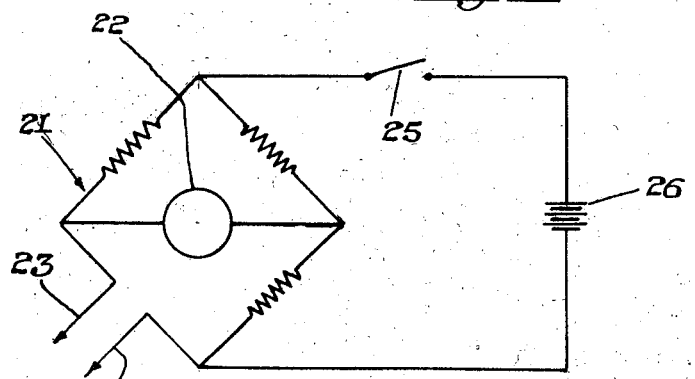
Figure 3 is a circuit diagram of the resistance measuring device shown in Figure 1.

The contact elements 19, 20, carried in the end of the rod 10, are adapted to receive complementary contact members (not shown), which in turn are connected to electrical leads 23, 24 communicating with a resistance measure device 21, shown in Figure 3.

The meter 21 may be selected from any one of a large number of devices which is capable of measuring minute variations in resistance, such as will be brought about by the changes in temperature of the thermistor, due to its being immersed in the material which is to be measured. The meter 21 may be of the ordinary D. C. micro-ammeter or millivoltmeter type, preferably with its electrical zero position located in mid-scale. The dial 22 is preferably calibrated directly in degrees. A switch 25 may be included in the circuit, which switch may be turned off when the instrument is not in use, to conserve the life of the battery 26.

The resistance measuring device 21 may be calibrated in degrees so that the temperature of the medium into which the thermometer is thrust may be read directly upon the measuring device dial 22.

When it is desired to use the measuring device, it is merely necessary to make electrical connection between the contact members 19, 20, and the resistance measuring device 21, place the thermometer in the medium sought to be measured, and read the temperature directly upon the measuring device. Thereafter, the thermometer may be disconnected from the measuring device, and hot-sterilized in accordance with clinical procedure.

By employing an air space between the cap member 12 and the rod 10, which air space substantially surrounds the thermistor in the chamber 13, and by the use of the very thin lead wire 17a, it has been found that a highly satisfactory result can be achieved. The thermistor 16, with the present structure, is not influenced by the action of ambient conductive material, such as metal rods, heavy wires, and the like, which would tend to conduct away a portion of the heat reaching the thermistor.

The air in the chamber 13 operates as an insulator whereby heat conducted through the front of the cap member 12 to the thermistor 15, quickly and accurately affects the thermistor, with the result that a very prompt and precise reading is available on the face of the meter 21.

From the foregoing, it will be seen that a very fast-acting, durable clinical thermometer has been provided, which lends itself to sterilization and more efficient use.

Having thus fully described the invention, what is claimed as new and described to be secured by Letters Patent of the United States is:

A resistance unit for a clinical thermometer comprising, a dielectric rod, a cup-shaped, electrically conductive, thin walled cap member covering the front end of the rod, said cap extending beyond the end of the rod, so as to provide an air chamber therein, a thermally sensitive resistor attached in thermally conductive contact with the inner wall of the cap, a very thin lead wire conductively secured at one end to the resistor and extending rearwardly thereof through the air chamber, a first conductor attached to the free end of the lead and longitudinally disposed within the rod, a second conductor connected to the wall of the cap and extending rearwardly through the rod.

References Cited in the file of this patent

UNITED STATES PATENTS

| | | |
|---|---|---|
| 1,411,396 | Wilson et al. | Apr. 4, 1922 |
| 1,752,117 | Smith | Mar. 25, 1930 |
| 2,365,706 | Keinath | Dec. 26, 1944 |
| 2,528,243 | Quinn | Oct. 31, 1950 |
| 2,627,182 | Quereau et al. | Feb. 3, 1953 |